Jan. 16, 1968 R. E. SCHOTT 3,363,649

FLUID PRESSURE CONTROL VALVE

Filed Dec. 27, 1965 2 Sheets-Sheet 1

Inventor
Robert E. Schott
By Kenneth Tuckiver
Attorney

United States Patent Office 3,363,649
Patented Jan. 16, 1968

3,363,649
FLUID PRESSURE CONTROL VALVE
Robert E. Schott, New Berlin, Wis., assignor to Allis-Chalmers Manufacturing Company, Milwaukee, Wis.
Filed Dec. 27, 1965, Ser. No. 516,351
5 Claims. (Cl. 137—596.12)

ABSTRACT OF THE DISCLOSURE

A hydraulic valve having hydraulic fluid pressure and flow control for gradually applying a friction coupling between two elements.

---

This invention relates generally to a hydraulic valve for controlling a power takeoff brake or clutch as desired on a farm or industrial tractor.

An object of this invention is to provide an improved valve which will permit gradual application of a brake or clutch.

Another object of this invention is to provide an improved hydraulic valve for directing fluid under pressure to fluid actuated means and for providing sensitive control.

Another object of this invention is to provide an improved hydraulic valve which permits gradual picking up a load on a clutch or brake while requiring a minimum amount of fluid volume to thereby permit use of multiple units in the circuit.

Another object of this invention is to provide an improved hydraulic pressure control valve which automatically shuts off the supply of pressure fluid when a movable component of the valve is fluid pressured into its closed position against a selected manually applied pressure.

A further object of this invention is to provide a hydraulic control valve which has the ability to infinitely vary the amount of slip that takes place between friction engaging surfaces of a clutch or brake.

A further object of this invention is to provide an improved control valve in a hydraulic circuit wherein an actuating fluid pressure set by the valve in a closed portion of the circuit is automatically made up despite leakage of the actuating fluid.

Still another object of this invention is to eliminate excessive throttling of fluid normally associated with hydraulic controls of this type.

Referring to the drawings.

Figure 3:
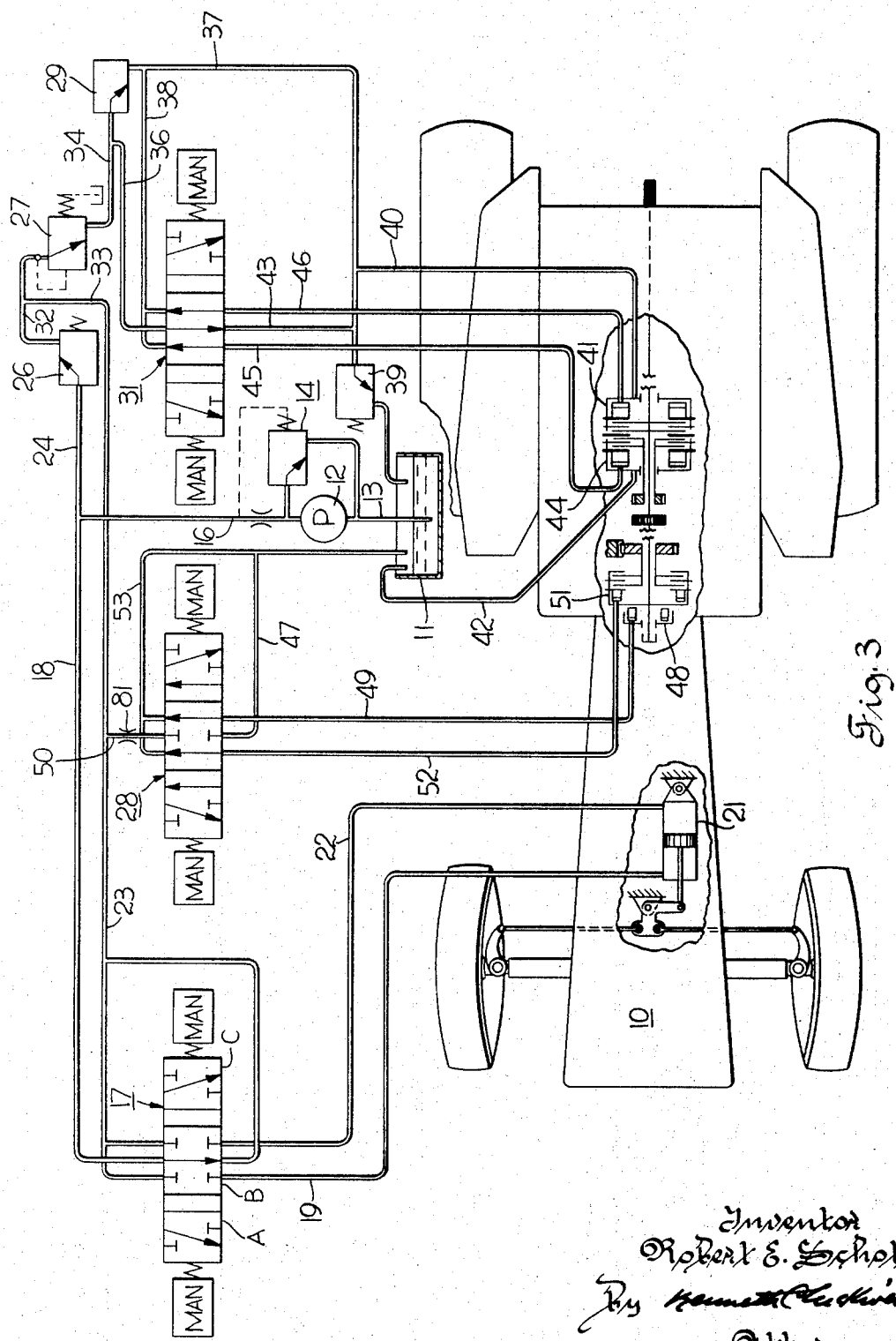
FIG. 3 is a diagrammatic view of the invention as embodied in a wheeled tractor.

Referring to FIG. 3, it is seen that the invention has been applied to a wheeled tractor 10 having a sump 11 connected to a hydraulic pump 12 by means of a line 13. Immediately ahead of pump 12, a priority flow control valve 14 is connected to outlet line 16 of pump 12 to provide a desired hydraulic capacity for power steering unit 17 which is connected to a steering wheel (not shown) on the tractor for actuation thereby. In other words, actuation of the steering wheel moves section A or C into operative position in valve 17 in place of neutral section B. Assuming section A has been moved into position, hydraulic fluid then flows from line 16 through branch 18 through power steering unit 17, through line 19 to the rod end of ram 21 actuating the steering linkage so that the tractor makes a right turn. The fluid in the piston end of ram 21 exhausts through line 22 through power steering unit 17 into line 23. If a left hand turn is desired, a movement of the steering wheel in such direction moves section C into operative position and hydraulic fluid from line 18 moves through unit 17 into line 22, and actuates the piston side of ram 21 to move the steering linkage in a left hand turn. Fluid in the rod end of ram 21 exhausts through line 19 through unit 17 to line 23.

Line 18 is provided with a branch line 24 to which is connected a relief valve 26. A pilot operated sequence valve 27 located downstream from power steering unit 17 assures that desired fluid pressure will be maintained in conduit 23 for the operation of a power takeoff control valve 28. A relief valve 29 located downstream from sequence valve 27 maintains a desired pressure for the operation of a power clutch control valve 31. In this manner a hydraulic circuit with valves in series can accommodate a number of hydraulic functions at a number of controlled maximum operating pressures.

Relief valve 26 is connected to sequence valve 27 by means of line 32 which is also connected to line 23 by means of conduit or line 33. Sequence valve 27 is connected to relief valve 29 by means of conduit 34 which is also connected to power clutch valve 31 by means of conduit 36. Relief valve 29 is connected to sump by means of line 37 which has a double ended branch 38 connected to valve 31. A relief valve 39 is interposed between sump 11 and line 37. A branch 40 of line 37 conducts fluid through clutch 41 and back to sump 11 by way of conduit 42. Relief valve 39 protects clutch 41 from excess pressure while providing an adequate supply of fluid through clutch 41 for cooling same.

Power clutch valve 31 is shown in its neutral position wherein pressure fluid from conduit 36 passes through valve 31 and discharges to sump 11 through lines 43, 37, 40 and 42. Power clutch valve 31 provides manual means for actuating clutch 41 or 44. To actuate clutch 44, valve 31 is shifted to the right and pressure fluid from conduit 36 passes through valve 31 to conduit 45 and actuates clutch 44. When clutch 44 is being actuated clutch 41 is open to sump by means of conduit 46 connecting up with conduits 38, 37, 40 and 42. When valve 31 is shifted to the left, clutch 41 is actuated by fluid from line 36 passing through conduit 46 while clutch 44 is open to sump 11 through lines 45, 38, 37, 40 and 42.

Power takeoff valve 28 is shown in its neutral position wherein pressure fluid from line 23 is blocked from passing through conduit 50 and through valve 28 to sump line 47 to sump 11. To actuate power takeoff brake 48, valve 28 is moved to the left and pressure fluid moves through conduit 50 from conduit 23 through valve 28 and conduit 49 actuating brake 48. Any leakage of fluid at the brake is returned to sump by means not shown. Clutch 51 is connected to sump during the actuation of brake 48 by means of conduits 52 and 53. To actuate power takeoff clutch 51, valve 28 is moved to the right and pressure fluid moves through conduit 50 from conduit 23 through valve 28 and conduit 52 actuating clutch 51. Any leakage of fluid at the clutch is returned to sump by means not shown. Brake 48 is connected to sump during the actuation of clutch 51 by means of conduits 49 and 53. From the foregoing, it is seen that a hydraulic circuit has been provided with valves in series, which can accommodate a number of hydraulic functions at the same time.

Figure 1:
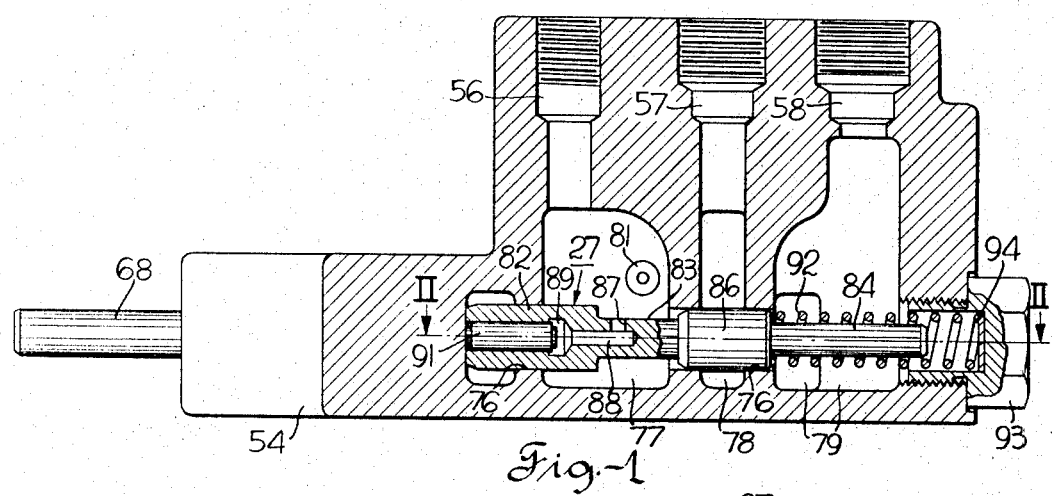
FIG. 1 is a plan view of a hydraulic valve assembly embodying the invention with a portion broken away for clarity of illustration.
Figure 2:
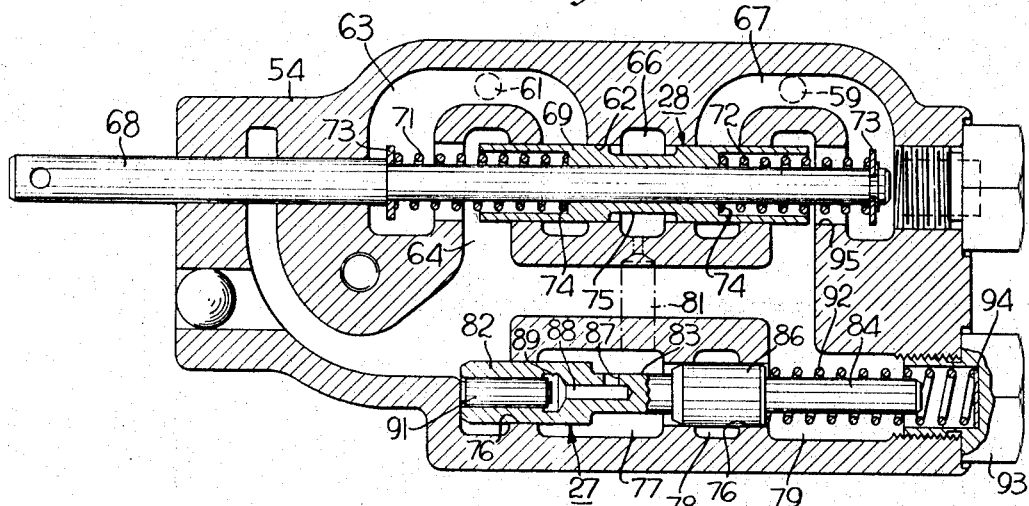
FIG. 2 is a sectional view taken on line II—II of FIG. 1.

Referring now to FIGS. 1 and 2, power takeoff valve 28 and sequence valve 27 have been combined in a single housing 54 having an inlet port 56, an outlet port 57 and a sump port 58. Two motor ports 59 and 61 (FIG. 2) are connected to conduits 49 and 52 (see FIG. 3) for operation of power takeoff brake 48 and clutch 51 respectively, are also provided in valve housing 54. A bore 62 (FIG. 2) in the valve housing is encircled by a series of chambers 63, 64, 66 and 67. Chambers 64 communicate with sump port 58 and chambers 63 and 67 communicate with motor ports 61 and 59, respectively. A control rod 68 is slidably mounted in bore 62 and is provided with a sliding valve spool 69 which is biased into a balanced central neutral position on rod 68 by means of compression springs 71 and 72. The springs 71 and 72 contact washer abutments 73 at their outer ends and their inner ends are received in end socket openings 74 in the valve spool 69. The valve spool 69 is provided with a central circular groove 75 to permit passage of pressure fluid from the pressure chamber 66 to either one of the selected brake or clutch chambers 63 and 67 upon the desired movement of rod 68.

Sequence valve 27 is also included in valve housing 54 as follows, valve housing 54 contains a second bore 76 which is encircled by chambers 77, 78 and 79. Chamber 77 is in communication with pressure chamber 66 by means of a restricted housing passage 81. Housing passage 81 is restricted so that the volume of fluid available to valve 28 is a desired amount so that it will not interfere with the operation of any one or all mechanisms simultaneously in the hydraulic circuit. Chamber 78 connects with outlet port 57. Chamber 79 is open to sump port 58. A valve spool 82 is slidably received in bore 76 and is provided with a circular groove 83 and reduced end portion 84 which define therebetween a land 86. Groove 83 is provided with a cross passage 87 which connects with an axial opening 88 said opening having an enlarged end portion 89 slidably receiving a plunger 91. A compression spring 92 surrounds the reduced end portion 84 of the valve spool 82 with one end of the spring contacting the land 86 and the other end the threaded end cap 93. Shims 94 are provided between the end cap and spring to adjust the amount of spring pressure and accordingly the amount of fluid pressure required to open sequence valve 27.

It will be noted that power takeoff valve 28 is symmetrical in structure. Consequently, a detailed description of its operation will be had with respect only to the side controlling the power takeoff clutch mechanism. It being understood that the control for the brake operates in a similar manner.

Assuming that the pump 12 is operating and that the power takeoff control valve 28 is in its illustrated neutral position, the pressure in chambers 66 and 77 increases until sequence valve 27 opens, whereupon chambers 66 and 77 are charged with fluid having a pressure equal to the setting of valve spring 92. Pressure fluid entering the valve opening 88 reacts on the plunger 91 causing the valve spool 82 and land 86 to move to the right against the bias of spring 92 thereby opening chamber 77 to the valve outlet opening 57 by way of chamber 78. With the control valve 28 in its neutral position, pressure fluid from pump 12 flows unrestricted through valve 27 to other operations downstream while maintaining adequate fluid pressure upstream of the sequence valve 27.

To pressurize or actuate the clutch motor 51, the control valve rod 68, by means of suitable manaully operated controls (not shown) is moved to the right from its illustrated neutral position. This movement of the control rod is transmitted through spring 71 to the valve spool 69 which is caused to move to the right to first close off clutch exhaust opening 95 (see FIG. 2). Continued manual movement of control rod 68 to the right places groove 75 of the valve spool 69 in communication with chamber 67 to admit pressure fluid thereto from chamber 66. As the pressure fluid flows into clutch chamber 67, fluid pressure builds up against right hand recessed end 74 of spool 69 causing hydraulic resistance to control rod movement, and imparting a necessary operator feel of the controls. As the fluid pressure builds up in clutch chamber 67, the spool is forced to the left by the hydraulic pressure thereby closing off the inlet opening to the chamber 67 and holding that pressure without any throttling of fluid. If more pressure or clutch engagement is desired, control rod 68 is manually moved further to the right again admitting pressure fluid from chamber 66 with the hydraulic pressure and again automatically shutting off the flow of pressure fluid depending on the position of the control rod.

An additional feature of this invention is that when operating rod 68 has been moved from neutral a distance less than full open or detent position, the fluid pressure developed within chamber 67 acts upon the spool 69 to shut off the supply of pressure fluid to chamber 67. Now supposing there is some leak in the system as for example the clutch or brake being actuated by the pressure fluid in chamber 67, under such circumstances when the fluid pressure on spool 69 drops, spring 71 will then move spool 69 to the right and open the passage between pressure chamber 66 and chamber 67 and as this pressure again rises spool 69 will again be shifted to the left closing off the passage. In other words, this valve automatically keeps the fluid pressure acting on the mechanism (brake or clutch) at the desired amount as determined by the amount the operating rod has been moved from neutral postion.

It should now be apparent that the present control valve mechanism provides for a gradual engagement or controlled slippage of the clutch or brake without throttling the pressure fluid. When control rod 68 is moved to its extreme position to the right, spring 71 becomes compressed to the point of being solid and under this condition the spool cannot move to the left from the hydraulic pressure being applied to the right recessed portion of spool 69 to close the connection between chambers 66 and 67. It should be noted that the farther rod 68 is moved to the right, the more pressure feel will be encountered by the operator and thereby giving him the desired feel for efficiency in controlling the mechanism. Detents associated with the controls (not shown) are provided for retaining rod 68 in its extreme right or left hand position.

To disengage the clutch, control rod 68 is manually moved from its detent position to the left toward its neutral position thereby opening clutch exhaust port 95 to sump. After rod 68 is moved from its detent position and manual force removed from rod 68, it will automatically return to its neutral position by action of spring 71 or 72 depending on which direction rod 68 has been moved from neutral position.

The embodiments of the invention in which an exclusive property or privilege is claimed are defined as follows:

1. In combination a control valve assembly comprising an elongated body having a longitudinally extending bore therein, an outlet port, inlet, and sump ports in said body which communicate with said bore, a pressure regulator valve connected between said inlet port and said outlet port for regulating the pressure at said inlet port, a first mechanism actuating port and a second mechanism actuating port communicating with said bore, an actuating rod slidably received in said bore, said rod including a spool slidably received thereabout and actuable between three positions, a neutral position, a first mechanism actuating position, and a second mechanism actuating position, a pair of springs mounted about said rod and spaced apart by said spool, stop means positioned on said rod adjacent the outer ends of said springs, a pressure chamber centrally located around said spool, restricted passage means connecting said inlet port to said pressure chamber about said spool to control the rate of flow to said valve, a pair of chambers located about said spool each connected with a mating actuating port and being spaced apart with said pressure chamber being positioned in between, said spool having a circular peripheral groove providing communication between said pressure chamber and one of said pairs of chambers when said spool is shifted from neutral in one direction and communication between said pressure chamber and the other one of said chambers when said spool is shifted from neutral in the opposite direction; hydraulic pressure means connected to said inlet, venting means providing communication between said pair of chambers and said sump port when said spool is in neutral position; said valve being so constructed that when said actuating rod is moved in one direction pressure fluid moves through said inlet port and bore to one of said pair of chambers for actuating one of said mechanisms until fluid pressure in said one chamber biases said spool against the force at one of said springs to a position blocking communication between said one chamber and said pressure chamber to control the rate of pressure increase in said one chamber.

2. The combination as recited in claim 1 and wherein said spool is provided with recessed ends for seating said springs and wherein one of said recessed ends is in communication with said fluid pressure source when said rod is manually shifted establishing communication between said pressure chamber and said one chamber, said fluid pressure acting upon said recessed portion for gradually closing the connection between said one chamber and said pressure chamber.

3. The combination as recited in claim 1 and wherein a manual shifting of said actuating rod in the opposite direction establishes communication between said pressure chamber and said other chamber and said other recessed portion, said pressure fluid actuating said other mechanism communicating with said other chamber and acting upon said other recessed portion for gradually closing the connection between said other chamber and said pressure chamber.

4. The combination as recited in claim 1 wherein said valve connected to said inlet port and said restricted passage controls the fluid pressure in said pressure chamber and provides sufficient pressure for operation of a mechanism downstream therefrom.

5. The combination as recited in claim 1 and wherein said springs bias said spool into a neutral position when manual force is released from said actuating rod thereby blocking communication between said pair of chambers and said pressure chamber and establishing communication between said pair of chambers and said sump.

References Cited

UNITED STATES PATENTS 2,922,400   1/1960   Lorence _____ 137—625.69 X
2,904,957   9/1959   Quayle _____ 91—434 X

FOREIGN PATENTS 179,865   1/1907   Germany.

HENRY T. KLINKSIEK, *Primary Examiner.*